2,799,656
NOVEL COMPLEX LUBRICATING GREASE COMPOSITION

Louis A. Mikeska and Jeffrey H. Bartlett, Westfield, and Arnold J. Morway, Rahway, N. J., assignors to Esso Research and Engineering Company, a corporation of Delaware No Drawing. Application June 23, 1953,
Serial No. 363,672

7 Claims. (Cl. 252—33.6)

This invention relates to lubricating grease compositions and particularly to lubricating grease compositions having outstanding high temperature properties and structure stability. More particularly the instant invention relates to lubricating grease compositions which are prepared by thickening a lubricating oil base stock to a grease consistency with a mixture of the alkali or alkaline earth metal soaps of a high molecular weight fatty acid, a low molecular weight acid, and the saponification product of an ester of a formal ether acid.

The invention will be more clearly explained by reference to the following examples, which are illustrative only, and are not to be taken as limiting the inventive concept.

EXAMPLE 1

*Preparation of methyl tridecoxymethoxy acetate*

A three way flask, equipped with a stirrer, a return condenser, a thermometer and an inlet tube for nitrogen was charged with 108.5 gms. (1.2 moles) of commercial methyl glycolate (B. P. 144° C.) and 298.2 gms. of distilled $C_{13}$ Oxo chloromethyl ether ($C_{13}H_{27}OCH_2Cl$). The mixture was gradually heated with stirring. Hydrogen chloride began to be given off at a good rate at 50° C. As the reaction subsided, the temperature was progressively raised until a temperature of 130° C. was reached. Heating at this level was continued until no more hydrogen chloride was given off (about 3 hours.)

The mixture was then cooled somewhat, treated with 50 cc. of water and stirred at 50° C. for about half an hour to decompose any unreacted chloromethyl ether that might be present. The solution was extracted with ether, the extract washed with water, dried over sodium sulfate and finally distilled under 1 mm. pressure. The bulk of the product (253 gms.) distilled at 190°–215° C.

By the procedure detailed below, a lubricating grease composition was prepared having the following formulation:

| Ingredients | Percent by Weight |
|---|---|
| Methyl Tridecoxymethoxy acetate ($C_{13}H_{27}OCH_2OCH_2COOCH_3$) | 10.00 |
| Hydrogenated Fish Oil acids | 10.00 |
| Acetic Acid Glacial | 4.00 |
| Sodium Hydroxide | 6.50 |
| Phenyl alpha naphthylamine | 1.00 |
| Mineral Oil (55 SUS/210° F.) | 68.50 |

The hydrogenated fish oil acids, the tridecoxymethoxy acetate and one half the mineral oil were charged to a fire heated grease kettle and warmed to 150° F. The glacial acetic acid and the sodium hydroxide in the form of a 40.0% aqueous solution were then charged in the order given. Heating was continued while hydrolyzing and saponifying the ester. Water and methyl alcohol were evaporated and vented to the atmosphere. When the mixture was approximately dry, that is, at a temperature of about 300°–350° F., the balance of the mineral oil was added and the temperature raised to about 500° F. The grease was then allowed to cool with agitation. The phenyl alphanaphthylamine was added at about 300° F. and the grease further cooled to about 200° F.

A portion of this grease was then removed from the kettle and homogenized by passage through a Gaulin homogenizer under a shearing force of about 500,000 reciprocal seconds. After homogenization the grease was submitted to the standard ASTM grease inspections. Results are set out below.

Penetrations (77° F., mm./10):
   Unworked _____ 220
   Worked (60 strokes) (ASTM fine hole worker
     plate) _____ 240
   Worked (100,000 strokes) _____ 310
Dropping point (° F.) _____ 485
Free alkilinity, as NaOH _____ 1.04%
Water washing test (percent loss) _____ 0.0
Norma Hoffmann oxidation test (hrs. to 5 p. s. i.
   pressure drop) _____ 210.0

Examination of the data reported above shows the excellent character of this grease. The high dropping point and the excellent water and oxidation resistance indicate excellent performance in high temperature applications, and in uses where it would be exposed to water.

EXAMPLE 2

The grease left in the grease kettle was further diluted with additional mineral oil to the following percentage composition:

| Ingredients | Percent by Weight |
|---|---|
| Methyl Tridecoxymethoxy acetate | 7.50 |
| Hydrogenated Fish Oil Acids | 7.50 |
| Acetic Acid, Glacial | 3.00 |
| Sodium Hydroxide | 4.88 |
| Phenyl alpha naphthylamine | 0.75 |
| Mineral Oil | 76.37 |

The diluted mixture was mixed thoroughly, passed through a Gaulin homogenizer at 100,000 to 500,000 reciprocal seconds, and resulted in a grease composition having the following properties:

Percent free alkalinity (NaOH) _____ 0.65
Penetration (77° F., mm./10):
   Unworked _____ 285
   Worked (60 strokes) _____ 290
   Worked (100,000 strokes) _____ 360
Dropping point (° F.) _____ 390
Water washing test (percent loss) _____ 5
Norma Hoffmann oxidation test (hrs. to 5 p. s. i.
   pressure drop) _____ 255

This grease was also submitted to Anti-Friction Bearing Manufacturers Association Test. This test acts as a screening test for anti-friction bearing greases.

1st test 80° F.
2nd test 220° F.
3rd test 250° F.

(In all tests the grease channeled, gave excellent lubrication with no tendency to change in structure from its original short fiber form and no leakage through the test bearing seal was observed at any of the test temperatures.)

EXAMPLE 3

*Preparation of decyl chloromethyl ether of methyl glycolate-propylene oxide condensate*

Step A.—A 4-necked flask equipped with a stirrer, a condenser, a thermometer, and a dropping funnel was charged with 360 g. (4 mol) of dry methyl glycolate and 10 cc. of boron fluoride-ethylether complex. The dropping funnel was charged with 1750 g. (32 mols) of dry propylene oxide. While stirring, the propylene oxide was added to the reactor drop by drop with sufficient cooling to keep the reaction temperature at 30° to 35° C.

When all the propylene oxide had been added, the mixture was stirred for one hour at room temperature. The product was then poured into water and extracted with ether. The extract was washed with dilute sodium hydroxide and then with water and was finally dried over anhydrous potassium carbonate.

On removal of the ether on the steam bath a straw-colored oil was obtained. This material was topped to 200° C. metal bath temperature under 1 mm. pressure. Only a few drops of distillate was obtained.

*Step B.*—A three way flask, equipped with a stirrer, a return condenser, a thermometer and an inlet tube for nitrogen was charged with 340.8 g. (.6 mol) of the condensation product prepared as described in Step A above, and 144 g. of distilled $C_{10}$ chloromethyl ether $$(C_{10}H_{21}OCH_2Cl)$$

The mixture was gradually heated with stirring. Hydrogen chloride began to evolve at a good rate at about 65° C. As the reaction subsided the temperature was progressively raised until a temperature of 150° C. was reached. Heating at this level was continued until no more hydrogen chloride was given off, or for about 3 hours.

The mixture was then cooled somewhat, treated with 50 cc. water and stirred at 50° C. for about a half an hour to decompose any unreacted chloromethyl ether that might be present. The solution was extracted with ether, the extract washed with water, dried over sodium sulfate, and finally topped to 230° C. bottoms temperature at 1 mm. pressure. Yield of 362 gms. of product.

A lubricating grease was prepared from the above product as follows:

FORMULATION

| Ingredients | Percent Weight |
|---|---|
| Hydrofol Acids 54 | 10.00 |
| $C_{10}H_{21}OCH_2(OCHCH_2)_{15}OCH_2\underset{\underset{CH_3}{\|}}{\overset{\overset{O}{\|}}{C}}-OCH_3$ | 10.00 |
| Glacial Acetic Acid | 4.00 |
| Sodium Hydroxide | 6.50 |
| Phenyl alpha naphthylamine | 1.00 |
| Mineral Oil | 68.50 |

PREPARATION

The hydrofol acid and the methyl ester and mineral oil were charged to the kettle and warmed to 150° F. while agitating. The acetic acid was added, followed by a 40% aqueous caustic solution. Continued heating to 300° F., dehydrating, hydrolyzing the methyl ester and venting the methyl alcohol to the atmosphere. Continued heating to 500° F. Continued stirring but removed heating source and cooled to 200° F. Then added phenyl alpha naphthylamine.

PROPERTIES

[Appearance—excellent smooth uniform grease]

| | Before Homogenization | After Homogenization |
|---|---|---|
| Penetrations, 77° F. mm./10: | | |
| Unworked | 188 | 150 |
| Worked (60 strokes) | 220 | 180 |
| Worked (100,000 strokes) | | 210 |
| Dropping Point,° F | | 500 |
| Water Washing Test (percent loss) | | 5 |
| Norma Hoffmann Oxidation Test (Hrs. to a 5 p. s. i. drop) | | 325 |

Although the above examples are limited to formals of methyl esters derived from glycolic acid, other esters of other hydroxy acids may also be used in the preparation of the novel lubricating greases of this invention. The $C_1$ to $C_5$ esters of any of the other commonly known hydroxy acids, such as lactic, hydroxy butyric, hydroxy valeric, hydroxy caproic may be used. These materials may be generally described by the formula

HOR'COOR'' wherein R' is a divalent hydrocarbon radical containing from 1 to 5 carbon atoms and wherein R'' is an alkyl group containing from 1 to 5 carbon atoms.

By preparing the short-chain ester of a hydroxy acid the alcohol obtained as a by-product in subsequent saponification is readily removed from the sphere of action by simply allowing it to distill off. The ester group does not interfere with this formulation reaction. In the above examples, the hydroxyl group of the hydroxy ester was reacted with a chloromethyl ether of an alcohol to form a formal ether-ester. Other chloromethyl ethers may be used to form other formal ether-esters operable in this invention. Such chloromethyl ethers of alcohols as the $C_4$ to $C_{20}$ may be used.

As shown by Example 3 it is within the concept of this invention to add from 1 to 20 alkylene oxide units to a hydroxy acid ester and thus build up the molecular weight of the molecule. For instance, units of such alkylene oxides as ethylene oxide, propylene oxide, and the like, may be added through the hydroxyl group in numbers that are limited only by the desired molecular weight. If mercapto acids are used to form the acid ester, or if the alpha-chloro ether of a mercaptan is used, molecules containing sulfur atoms may be prepared which may also be utilized in forming the greases of this invention. For instance, an acid such as thioglycolic acid may be esterified with a short chain alcohol to form a compound

HSR'COOR'' which may be reacted with a chloromethyl thioether to form a compound containing two or more sulfur atoms.

$RSCH_2Cl + HSR'COOR'' \rightarrow RSCH_2SR'COOR''$

Other modifications will be apparent to those skilled in the art.

The basic material which is reacted with the ether-ester to form the novel soap of this invention may be any of the commonly used alkali or alkaline earth metal hydroxides. For example, in addition to the sodium hydroxide utilized above, one may use the hydroxides of lithium, barium, strontium, calcium, and the like.

Other complex forming materials may be used in addition to the acetic acid of the examples. This low molecular weight acid forms a complex structure with the soap of the high molecular weight fatty acid and imparts additional structural stability to the greases of invention. Although acetic acid is preferred, other low molecular weight acids such as propionic, butyric, furoic, acrylic, and the like may be used.

The high molecular weight fatty acid which may be included as a soap-former in the greases of invention may be selected from a large list of the commonly known soap-forming fatty acids. Such materials as the hydrogenated fish oil acids, stearic acid, oleic acid, hydroxystearic acid, glycerides, tallow, beef fat, and the like may be used.

The lubricating oil that is used as the base oil for formulating the greases of invention may be any of the naturally occurring lubricating oils known to the art. The lubricating oil chosen should be the one that would be used for the lubricating application if a liquid could be used. The various petroleum distillates having viscosities ranging from about 35 to 90 SSU at 210° F. are operable. Synthetic lubricating oils may also be used.

The esters, ethers, ether-esters, such as dibasic acid esters, complex esters of dibasic acids, glycols and alcohols may be used. However, these saponifiable materials can only be employed after formation of the soap complex in some unhydrolyzable medium. Various other types of synthetic oils, such as polymerized hydrocarbons, formals of hydroxyl containing compounds, etc. are operable.

The amount of the soap forming material that is used in the formulation of the greases of invention will depend somewhat upon the desired consistency. For instance, from about 3.0% to 30% by weight, based on the weight of the total formulation may be used, but from 7.5% to 25.0% is preferred.

Although it is preferred to combine a soap of a high molecular weight fatty acid complexed with a salt of a low molecular weight fatty acid with the novel soap of the instant invention, it is within the concept of this invention to utilize the soap of the ether-ester alone to prepare the greases of invention. In this case, from about 10% to 30% of the soap would be used.

In the preferred embodiment of the invention a mineral lubricating oil is thickened to a grease consistency with a mixture of from about 5% to 15% by weight of a complex formed from the alkali metal soap of a high molecular weight fatty acid and the alkali metal salt of a low molecular weight acid in the proportion of 1 mole of the soap to 1 mole of the salt with from 2% to 20% of the alkali metal soap of a material having the formula

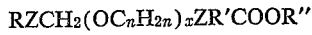
RZCH$_2$(OC$_n$H$_{2n}$)$_x$ZR'COOR'' wherein R is an aliphatic alkyl group containing from 4 to 30 carbon atoms, preferably 6–18 carbon atoms, wherein R' is a divalent hydrocarbon radical, and wherein R'' is an alkly group containing from 1 to 5 carbon atoms, wherein Z is oxygen or sulfur, and wherein $x$ is a number from 0 to 20. Especially preferred are the ethers formed by reacting alpha-chloromethyl ethers with esters or ether esters of hydroxy acids selected from the class consisting of glycolic, lactic, hydroxy butyric, hydroxy valeric, and hydroxy caproic acids.

In addition to the antioxidant used in the examples, other additive materials may be added to the greases of invention.

What is claimed is:

1. A lubricating grease composition which consists essentially of a lubricating oil base stock thickened to a grease consistency with a mixture of a complex of a metal soap of a high molecular weight fatty acid and a metal salt of a low molecular weight acid combined with a metal soap of a material having the formula

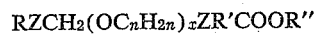
RZCH$_2$(OC$_n$H$_{2n}$)$_x$ZR'COOR'' wherein R is an alkyl group having from 4 to 30 carbon atoms, R' is a divalent hydrocarbon radical containing from 1 to 5 carbon atoms, R'' is an alkyl group containing from 1 to 5 carbon atoms, Z is selected from the group of oxygen and sulfur, $n$ is a number from 2 to 3 and $x$ is a number from 0 to 20 said metal being selected from the group consisting of alkali and alkaline earth metals.

2. A lubricating grease composition according to claim 1 wherein said metal soap is a sodium soap and wherein said metal salt is a soduim salt.

3. A lubricating grease composition according to claim 1 wherein said metal soap is the soduim soap of hydrogenated fish oil acids, said metal salt is the sodium salt of acetic acid, and wherein said material of the formula is the methyl ester of tridecoxymethoxy acetic acid.

4. A lubricating grease composition which consists essentially of a lubricating oil base stock thickened to a grease consistency with a mixture of from about 5.0% to 15.0% by weight of a complex formed from the alkali metal soap of a high molecular weight fatty acid and the alkali metal salt of a low molecular weight acid in the proportion of 1 mol of the soap to 1 mol of the salt combined with from about 2.0% to 20.0% by weight of the alkali metal soap of a material of the formula

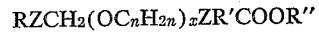
RZCH$_2$(OC$_n$H$_{2n}$)$_x$ZR'COOR'' wherein R is an alkyl group having from 6 to 18 carbon atoms, R' is a divalent hydrocarbon radical containing from 1 to 5 carbon atoms, R'' is an alkyl group containing from 1 to 5 carbon atoms, Z is selected from the group of oxygen and sulfur, $n$ is a number from 1 to 3 and $x$ is a number of from 0 to 20.

5. A lubricating grease composition according to claim 4 wherein R is an alkyl group having 13 carbon atoms, wherein R' is —CH$_2$—, wherein R'' is —CH$_3$, wherein Z is oxygen, and wherein $x$ is zero.

6. A lubricating grease composition according to claim 4 wherein R is an alkyl group containing 10 carbon atoms, wherein R' is —CH$_2$—, wherein R'' is —CH$_3$, wherein Z is oxygen, and wherein $x$ is 16.

7. A lubricating grease composition consisting essentially of a mineral lubricating oil base stock thickened to a grease consistency with a mixture of about 5.0% to about 15.0% by weight of a complex formed from equimolar proportions of the sodium soap of hydrogenated fish oil acid and the sodium salt of acetic acid combined with from 2.0% to 20.0% by weight of the sodium soap of a material of the formula

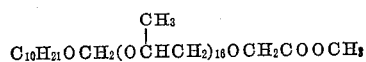
$$C_{10}H_{21}OCH_2(OCHCH_2)_{16}OCH_2COOCH_3$$
$$\phantom{C_{10}H_{21}OCH_2(O}|\phantom{HCH_2)_{16}OCH_2COOCH_3}$$
with CH$_3$ branch

References Cited in the file of this patent

UNITED STATES PATENTS

| | | |
|---|---|---|
| 2,575,286 | Morway et al. | Nov. 13, 1951 |
| 2,589,973 | Smith et al. | Mar. 18, 1952 |
| 2,612,472 | Morway et al. | Sept. 30, 1952 |
| 2,612,473 | Morway et al. | Sept. 30, 1952 |
| 2,618,598 | Morway et al | Nov. 18, 1952 |
| 2,623,854 | Morway et al. | Dec. 30, 1952 |